(12) United States Patent
Hart et al.

(10) Patent No.: US 11,870,251 B2
(45) Date of Patent: *Jan. 9, 2024

(54) SYSTEM AND METHOD FOR CONTROLLING A POWER GENERATING SYSTEM

(71) Applicant: General Electric Company, Schenectady, NY (US)

(72) Inventors: Patrick Hammel Hart, Ballston Lake, NY (US); Alfredo Sebastian Achilles, Niskayuna, NY (US); Randal Voges, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 17/393,649

(22) Filed: Aug. 4, 2021

(65) Prior Publication Data

US 2023/0045585 A1 Feb. 9, 2023

(51) Int. Cl.
*H02J 13/00* (2006.01)
*G05B 19/042* (2006.01)
*H02J 3/38* (2006.01)

(52) U.S. Cl.
CPC ...... *H02J 13/00002* (2020.01); *G05B 19/042* (2013.01); *H02J 3/381* (2013.01); *G05B 2219/2619* (2013.01); *H02J 2300/28* (2020.01)

(58) Field of Classification Search
CPC .. H02J 13/00002; H02J 3/381; H02J 2300/28; H02J 2203/10; H02J 3/48;

(Continued)

(56) References Cited

U.S. PATENT DOCUMENTS 7,839,024 B2 11/2010 Cardinal et al.
9,859,710 B2 * 1/2018 Garcia .................... F03D 9/255
(Continued)

FOREIGN PATENT DOCUMENTS

EP 3930136 A1 12/2021

OTHER PUBLICATIONS

EP Search Report for EP application No. 22182625.8, dated Dec. 21, 2022, 11 pages.

Primary Examiner — Mohammad Ali
Assistant Examiner — Dhruvkumar Patel
(74) Attorney, Agent, or Firm — Dority & Manning, P.A.

(57) ABSTRACT

A system and method are provided for controlling a power generating system having a power generating subsystem connected to a point of interconnection (POI). A first and a second data signal are obtained corresponding to a feedback signal of an electrical parameter regulated at the POI, the second data signal having a signal fidelity that is higher than that of the first data signal. A correlation value between the first and second data signals is obtained by filtering a value difference between the first and second data signals and is applied to a setpoint value for the electrical parameter regulated at the POI. The modified setpoint value and the second data signal are combined to generate a setpoint command for the power generating subsystem that is used for controlling generation of power at the power generating subsystem to regulate the electrical parameter at the POI.

20 Claims, 6 Drawing Sheets

(58) Field of Classification Search
CPC .......... G05B 19/042; G05B 2219/2619; Y02E 10/72; Y02E 10/76
See application file for complete search history.

(56) References Cited

U.S. PATENT DOCUMENTS

| | | |
|---|---|---|
| 2010/0195357 A1 | 8/2010 | Fornage et al. |
| 2015/0337808 A1* | 11/2015 | Kang ........................ H02J 3/16 290/44 |
| 2017/0271882 A1 | 9/2017 | Ravikumar et al. |
| 2019/0010925 A1* | 1/2019 | Scott ..................... F03D 7/0284 |
| 2021/0143642 A1* | 5/2021 | Gupta ..................... H02J 3/001 |

* cited by examiner

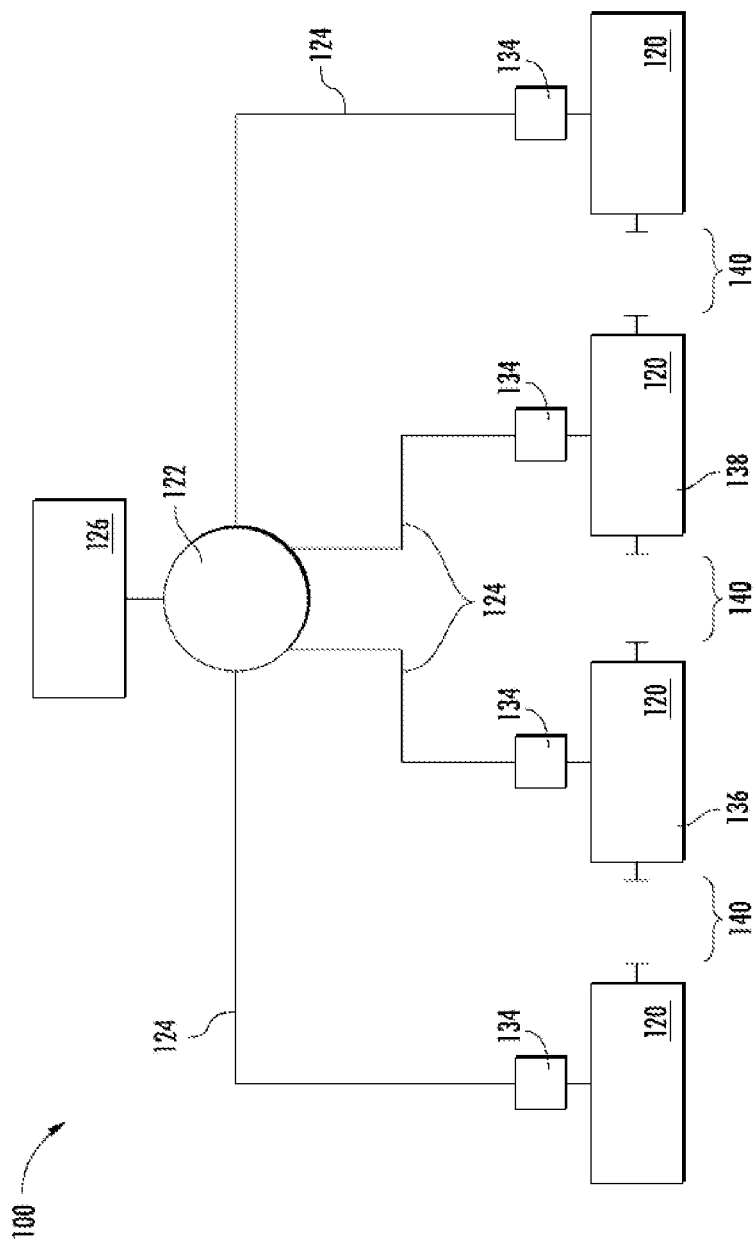
Fig. -1-

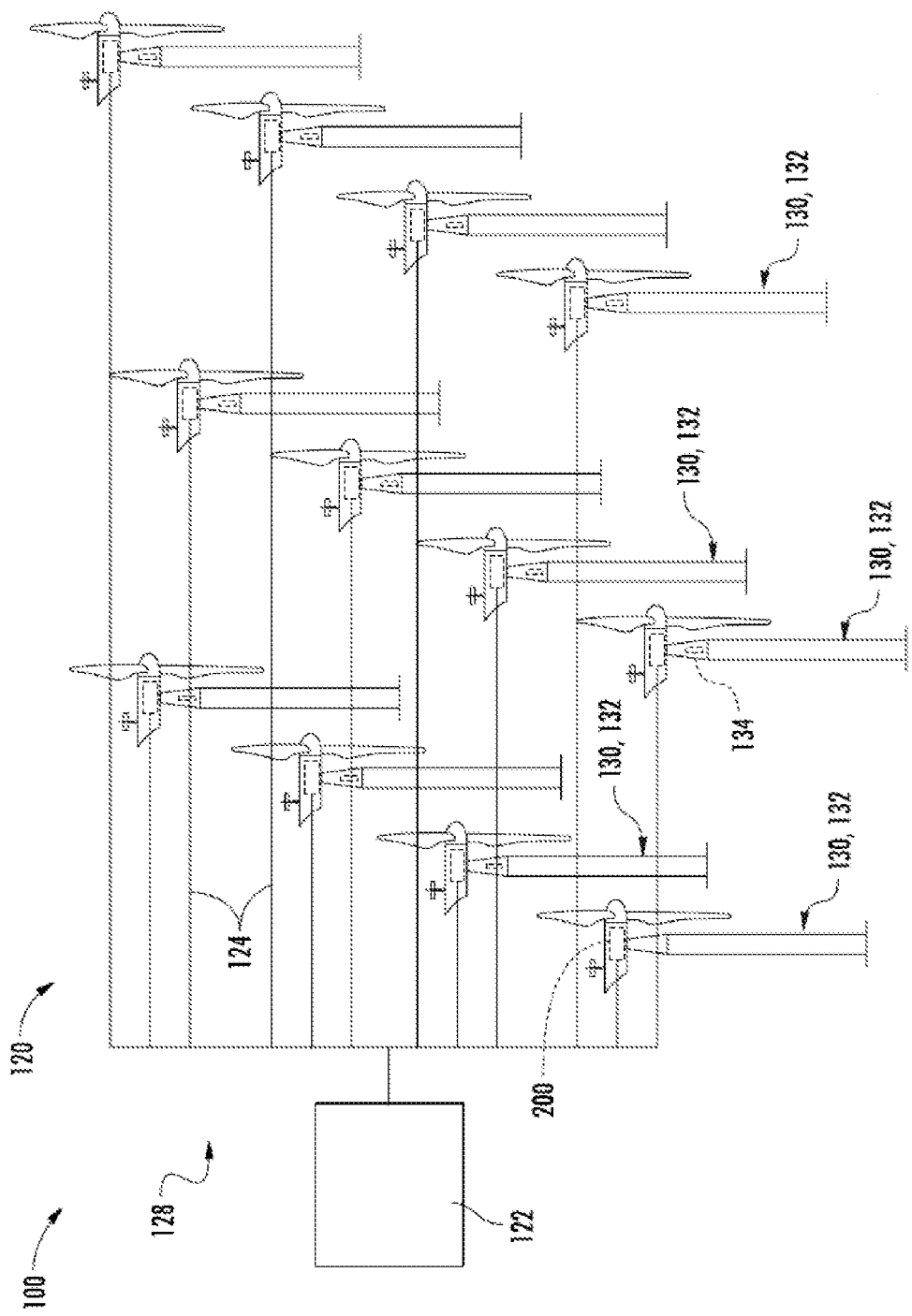
Fig. -2-

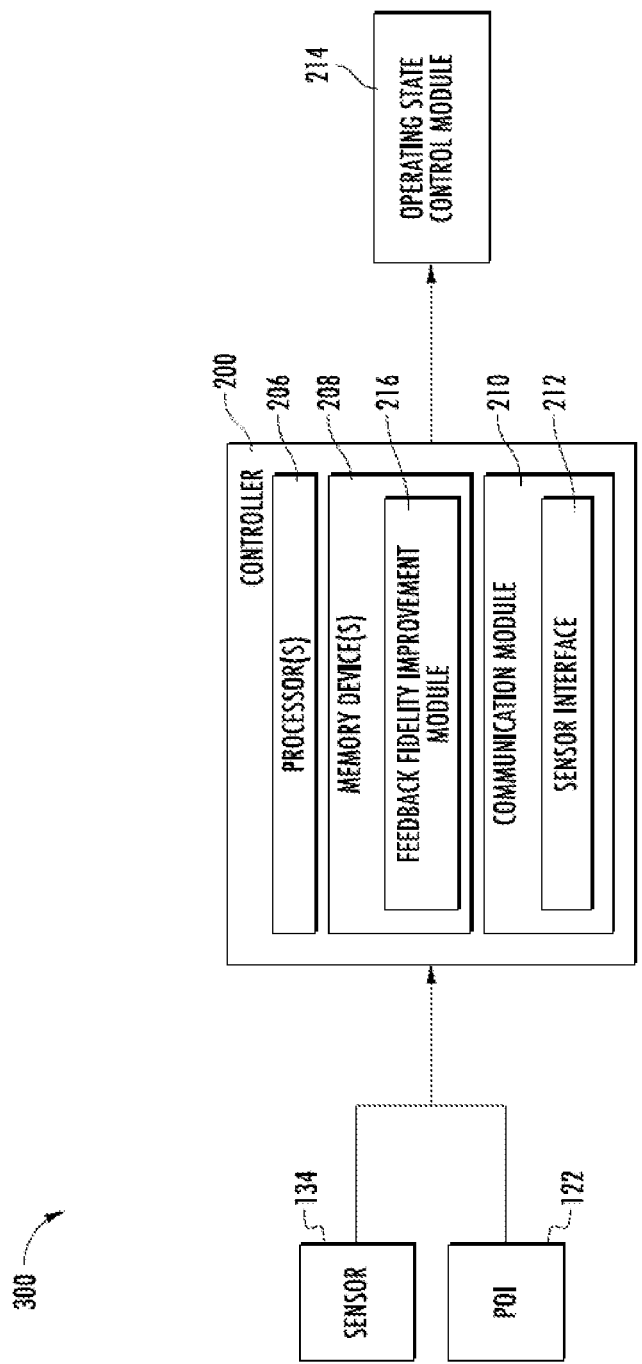
Fig. -3-

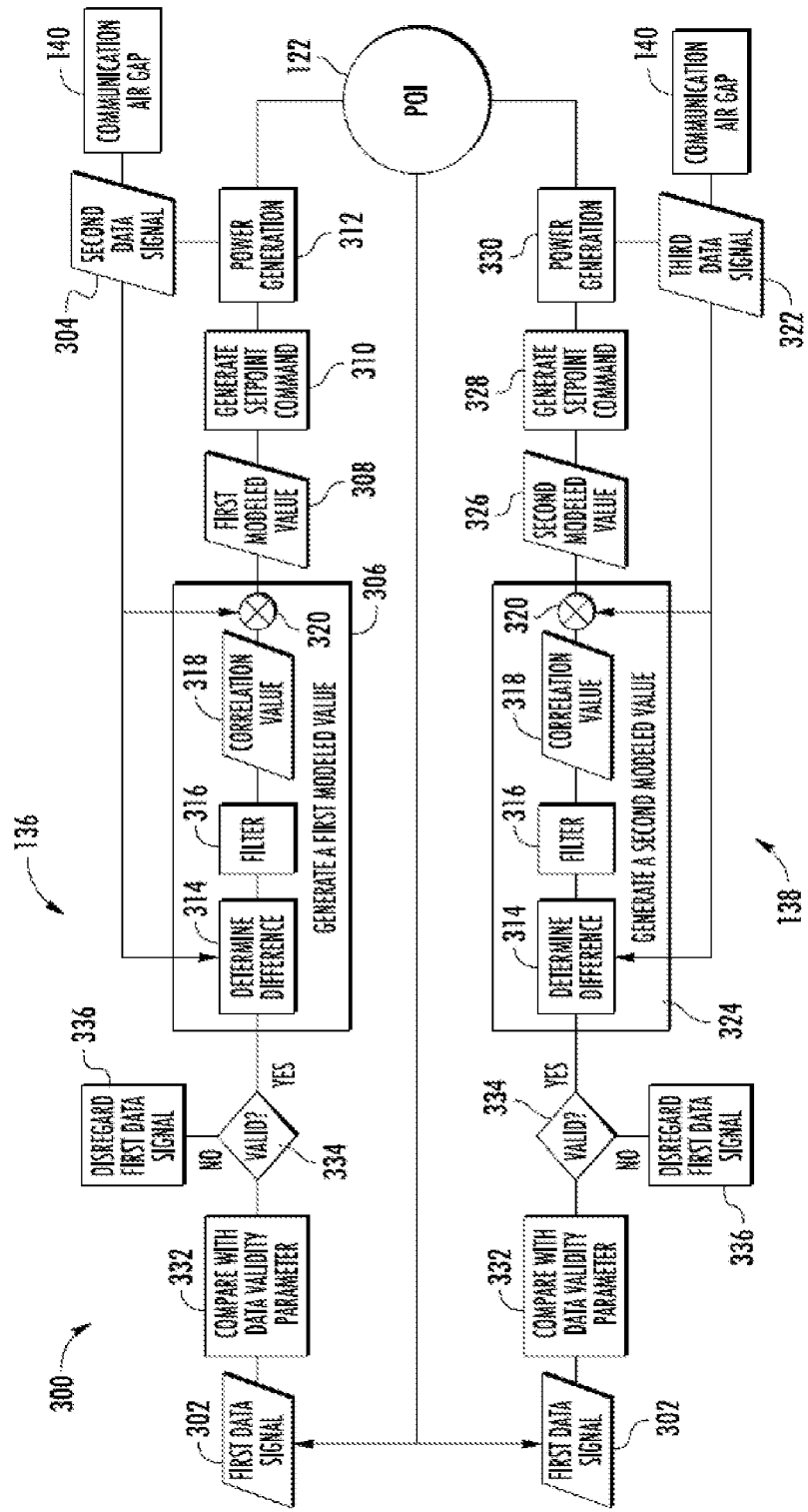
Fig. -4-

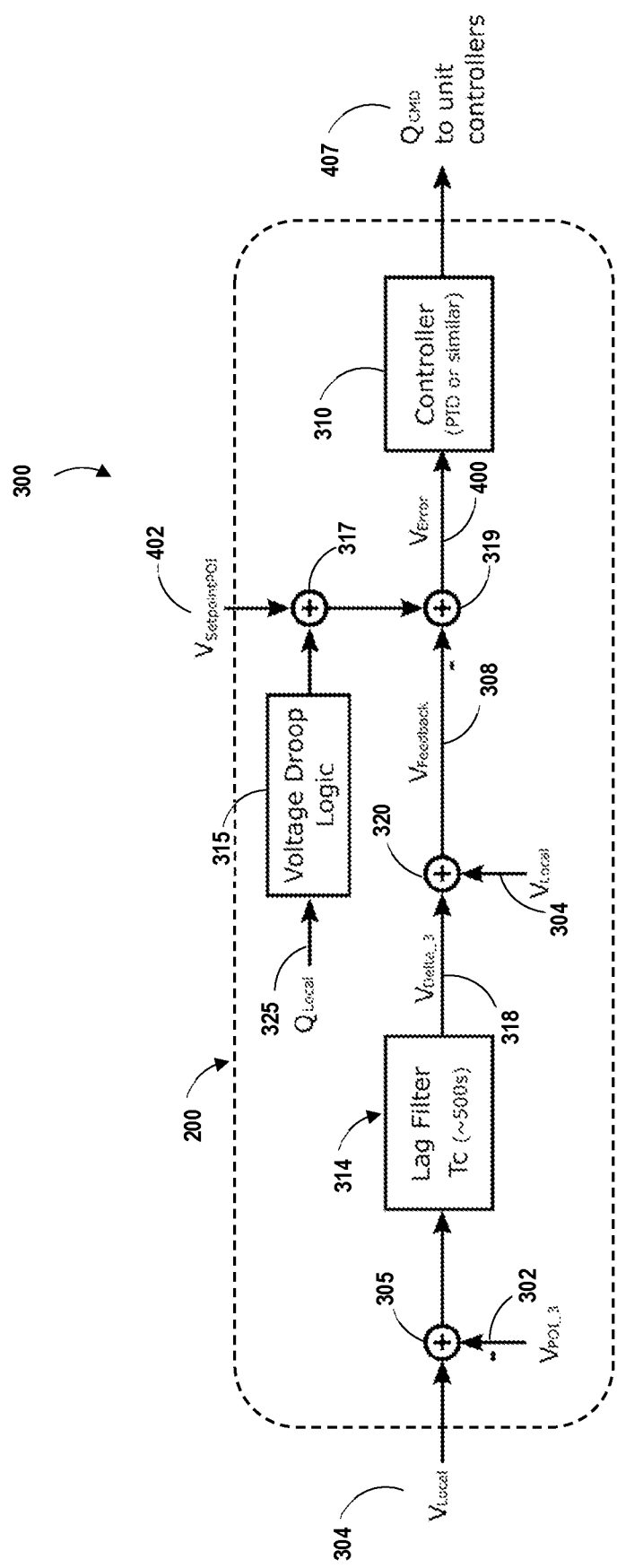
Fig. -5-

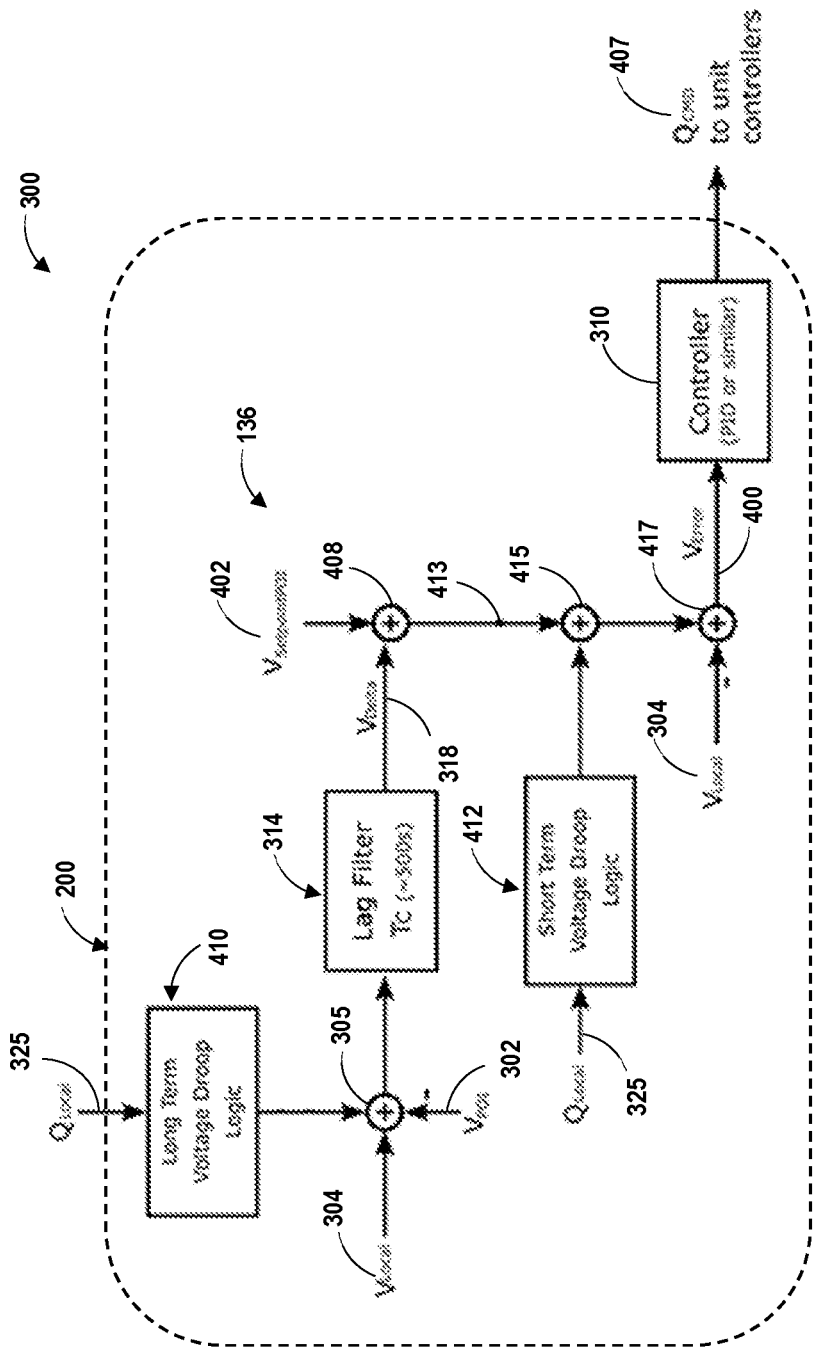
Fig. -6-

SYSTEM AND METHOD FOR CONTROLLING A POWER GENERATING SYSTEM

FIELD

The present disclosure relates in general to power generating systems, and more particularly to systems and methods for controlling power generating systems having power generating subsystems.

The subject matter of this disclosure relates to U.S. patent application Ser. No. 16/911,476 filed on Jun. 25, 2020, which is incorporated herein by reference for all purposes.

BACKGROUND

Renewable power is considered one of the cleanest, most environmentally friendly energy sources presently available, and power generating facilities which include renewable power assets have gained increased attention in this regard. One example of such a renewable power asset is a wind turbine. Modern wind power generation systems typically take the form of a wind farm having multiple such wind turbine generators that are operable to supply power to a transmission system providing power to an electrical grid.

In modern renewable power applications, multiple power generating subsystems, such as multiple wind farms, may be coupled together at a point of interconnection (POI), such as a POI for an electrical grid. As interest in renewable power has increased, the number of power generating subsystems regulated at the single POI has increased. As a result, interactions between the multiple power generating subsystems has increased such that the output of one power generating subsystem may affect the other power generating subsystems coupled to the same POI. Accordingly, efficient regulation of each of the power generating subsystems may require accurate and timely collection of data concerning electrical parameters at the POI.

One approach for regulating the power generating subsystems may be to obtain direct measurement of the electrical parameters at the POI. However, in many instances, the POI is a component of the electrical grid, therefore, installation of sensors by the power generating subsystem operators may not be permitted. Accordingly, information concerning the electrical parameters of the POI may be provided by the POI operator, with the power generating subsystem operators having little to no control over the fidelity of the information received from the POI operator.

Accordingly, the information received from POI operator may be of a lower fidelity than would otherwise be desirable for the efficient regulation of each power generating subsystem. As such, it is desirable to facilitate the efficient regulation of each power generating subsystem despite utilizing the low-fidelity information regarding the electrical parameters at the POI.

An additional approach for managing the effect of one power generating subsystem on the remaining power generating subsystems coupled to the POI may be through the establishment of communicative links between the power generating subsystems. In such a configuration, each of the power generating subsystems may communicate information concerning the electrical parameters at the power generating subsystem to other connected power generating subsystems. These inputs may then be combined to determine the electrical parameters at the POI. However, such communicative links increase may result in increased costs, require significant coordination between power generating subsystem owners, and may reduce the security of each generating subsystems.

Accordingly, it is desirable to facilitate the efficient regulation of each of the power generating subsystems without requiring the sharing of electrical parameter information between the power generating subsystems.

Thus, the art is continuously seeking new and improved systems and methods that address the aforementioned issues. As such, the present disclosure is directed to systems and methods for controlling a power generating system based on electrical parameter information at the POI.

BRIEF DESCRIPTION

Aspects and advantages of the invention will be set forth in part in the following description, or may be obvious from the description, or may be learned through practice of the invention.

In one aspect, the present disclosure is directed to a method for controlling a power generating system that includes at least one power generating subsystem connected to a point of interconnection (POI). The method includes receiving at a subsystem controller of the power generating subsystem, a first data signal corresponding to a feedback signal of an electrical parameter regulated at the POI, the feedback signal having a first signal fidelity. The method also receives a second data signal indicative of the electrical parameter generated at the power generating subsystem, the second data signal having a second signal fidelity that is higher than the first signal fidelity. With the subsystem controller, the method includes generating a correlation value between the first and second data signals by filtering a value difference between the first and second data signals. Then, with the subsystem controller, the correlation value is applied to a setpoint value for the electrical parameter regulated at the POI to generate a modified setpoint value. With the subsystem controller, the method includes using the modified setpoint value to generate a setpoint command for the power generating subsystem and controlling generation of power at the power generating subsystem using the setpoint command to regulate the electrical parameter at the POI.

In a particular embodiment, the filtering step includes applying a lag filter to the value difference between the first and second data signals.

In may be desirable in certain embodiments to apply a long term droop value to the value difference between the first and second data signals.

In still other embodiments, it may be desired to apply a short term droop value to the modified parameter setpoint value.

In some embodiments, the method may include applying a long term droop value to the value difference between the first and second data signals and a short term droop value to the modified parameter setpoint value.

The power generating system may be variously configured. For example, in on embodiment, the system may include a plurality of the power generating subsystems each having a corresponding subsystem controller, wherein the first data signal and the setpoint value are common to each of the subsystem controllers for carrying out the method.

In certain embodiments, the power generating subsystems are not communicatively coupled with regards to the second data signal obtained by each of the subsystem controllers such that the second data signal from a respective one of the power generating subsystems is unknown to the other power generating subsystems.

In one embodiment of the power generating system, the power generating subsystems are individual wind farms connected at the POI and the subsystem controllers are individual wind farm controllers. In this embodiment, the first data signal and the setpoint value for the parameter regulated at the POI are obtained from a utility provider of an electrical grid connected to the POI.

In still another embodiment of the power generating system, the power generating subsystems are individual wind turbines within a wind farm and the subsystem controllers are individual wind turbine controllers. In this embodiment, the first data signal and setpoint value for the parameter regulated at the POI are obtained from a wind farm controller for the wind farm.

The first and second data signal fidelities may include a measure of at least one of a refresh rate, a sensor accuracy, a sensor resolution, or a communication delay.

The electrical parameter that is regulated at the POI may include at least one of voltage, current, power, or frequency.

The present disclosure also encompasses various embodiments of a system for controlling a power generating system, wherein the system includes at least one power generating subsystem connected to a point of interconnection (POI). The power generating subsystem includes a subsystem controller having at least one processor configured to perform a plurality of operations, including: receive a first data signal corresponding to a feedback signal of an electrical parameter regulated at the POI, the first data signal having a first signal fidelity; receive a second data signal indicative of the electrical parameter generated at the power generating subsystem, the second data signal having a second signal fidelity that is higher than the first signal fidelity; generate a correlation value between the first and second data signals by filtering a value difference between the first and second data signals; generate a modified setpoint value by applying the correlation value to a setpoint value for the electrical parameter regulated at the POI; use the modified setpoint value to generate a setpoint command for the power generating subsystem; and control power generation at the power generating subsystem using the setpoint command to regulate the electrical parameter at the POI.

In a particular embodiment of the system, generation of the correlation value includes applying a lag filter to the value difference between the first and second data signals.

In certain of the system embodiments, the subsystem controller is further configured to apply one or both of a long term droop value to the value difference between the first and second data signals and a short term droop value to the modified parameter setpoint value.

In some embodiments, the system may include a plurality of the power generating subsystems each having a corresponding subsystem controller, wherein the first data signal and the parameter setpoint value are common and used by each of the subsystem controllers to perform the plurality of operations.

The system may be configured such that the plurality of power generating subsystems are not communicatively coupled with regards to the second data signal obtained by each of the subsystem controllers. In this configuration, the second data signal from a first one of the power generating subsystems is unknown to a second one of the power generating subsystems.

In a particular embodiment, the power generating subsystems include individual wind farms connected at the POI and the subsystem controllers are wind farm controllers. The first data signal and the setpoint value for the parameter regulated at the POI are obtained from a utility provider of an electrical grid connected to the POI.

In an alternative embodiment, the power generating subsystems are individual wind turbines within a wind farm and the subsystem controllers include individual wind turbine controllers, and wherein the first data signal and the setpoint value for the parameter regulated at the POI are obtained from a wind farm controller for the wind farm.

In still other embodiments, the power generating subsystems may be one or a combination of solar power plants, hydroelectric plants, or hybrid power generation facilities, and wherein the first data signal is obtained from an electrical grid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic diagram of a power generating system according to the present disclosure;

FIG. 2 illustrates a schematic diagram of a wind farm having a plurality of wind turbines according to the present disclosure;

FIG. 3 illustrates a schematic diagram of one embodiment of a controller for use with the power generating system according to the present disclosure;

FIG. 4 illustrates a schematic diagram of one embodiment of control logic of a system for controlling a power generating system according to the present disclosure;

FIG. 5 illustrates a schematic diagram of an embodiment the method and system of FIG. 4 configured for a wind farm; and FIG. 6 illustrates a schematic diagram of an alternate embodiment of a method and system configured for a wind farm.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The term "coupled" and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Generally, the present disclosure is directed to systems and methods for controlling a power generating system having a plurality of power generating subsystems connected to an electrical grid at a point of interconnection (POI). In particular, the present disclosure may include a system and method which may facilitate the efficient operation of the power generating subsystems utilizing a low-fidelity electrical parameter signal from the POI as a baseline underpinning the control operations. In certain embodiments, the signal is a feedback signal of an electrical parameter regulated at the POI. Accordingly, the systems and methods presented herein may utilize high-fidelity electrical parameter signals obtained from the power generating subsystems to overcome the undesirable fidelity of the low-fidelity electrical parameter signal. Specifically, the systems and methods may utilize the high-fidelity signal and the low-fidelity signal to model a signal from the POI having sufficient fidelity. The modeled signal may be used to control each of the power generating subsystems, which in turn regulate the electrical parameter at the POI. As such, the low-fidelity signal broadcast from the electrical grid may serve as baseline facilitating the asynchronous control of a number of power generating subsystems without requiring communication or coordination between the power generating subsystems.

Referring now to the drawings, FIG. 1 illustrates a schematic diagram of one embodiment a power generating system 100 according to the present disclosure. As depicted in FIG. 1, in an embodiment, the power generating system 100 may include at least one power generating subsystem 120 connected to a POI 122 via a communication link 124. For example, in the illustrated embodiment, the power generating system 100 includes a plurality of the power generating subsystems 120 connected to the POI 122. Further, in such embodiments, the POI 122 may be the point at which the power generating subsystems 120 are electrically coupled to an electrical grid 126.

Referring now to FIG. 2, in an embodiment, the power generating subsystem(s) 120 may be configured as a power generating facility 128, such as a wind farm. However, in additional embodiments, the power generating facility 128 may be any other suitable power generating facility, such as a hydro-electric plant, a solar power plant, an energy storage plant, a fossil fuel generator site, and/or a combination thereof, such as a hybrid power generation facility. In an embodiment, as shown, the power generating facility 128 may include a plurality of the power generating assets 130 as described herein, such as a plurality of wind turbines 132.

It should be appreciated that the power generating facilities 128 may be coupled to the POI 122 via communication links 124.

As depicted in FIGS. 2 and 3, in an embodiment, the power generating subsystem(s) 120 may be configured as the power generating asset 130. For example, the power generating asset 130 as described herein may be configured as a wind turbine 132, solar panels, hydroelectric facilities, tidal generators, waive generators, and/or fossil fuel generators. In such an embodiment, the power generating asset(s) 130 may be coupled to the POI 122 of the power generating facility 128 via communication links 124 and ultimately to the electrical grid 126.

The power generating subsystem(s) 120 may also include a subsystem controller 200. For example, as shown in FIG. 2, when configured as a wind turbine 132, the subsystem controller 200 may be centralized within the nacelle of the wind turbine. However, in other embodiments, the subsystem controller 200 may be located within any other component of the power generating subsystem(s) 120 or at a location outside the power generating subsystem(s) 120. Further, the subsystem controller 200 may be communicatively coupled to any number of the components of the power generating subsystem(s) 120 in order to control the components. As such, the subsystem controller 200 may include a computer or other suitable processing unit. Thus, in several embodiments, the subsystem controller 200 may include suitable computer-readable instructions that, when implemented, configure the subsystem controller 200 to perform various different functions, such as receiving, transmitting and/or executing setpoint commands.

Still referring to FIG. 2, one or more sensors 134 may be provided on the power generating subsystem(s) 120 to monitor the performance of the power generating subsystem(s) 120. It should also be appreciated that, as used herein, the term "monitor" and variations thereof indicates that the various sensors of the power generating subsystem(s) 120 may be configured to provide a direct measurement of the parameters being monitored or an indirect measurement of such parameters. Thus, the sensors described herein may, for example, be used to generate data signals indicative of an electrical parameter at the power generating subsystem(s) 120.

In an embodiment, the sensor(s) 134 may be configured as an operating condition sensor. For example, the sensor(s) 134 may be configured to monitor electrical parameters of the output of the power generating subsystem(s) 120. As such, the sensor(s) 134 may be a current sensor, voltage sensor, temperature sensors, power sensor, and/or frequency meter that monitors the electrical output of the power generating subsystem(s) 120. For example, the sensor(s) 134 may be configured to generate the data signals indicative of an electrical parameter relating to voltage, current, power, and/or frequency developed by the power generating subsystem(s) 120.

Referring now to FIGS. 1-4, depictions of multiple embodiments of a system 300 for controlling the power generating system 100 according to the present disclosure are presented. As shown particularly in FIG. 3, a schematic diagram of one embodiment of suitable components that may be included within the subsystem controller 200 is illustrated. For example, as shown, the subsystem controller 200 may include one or more processor(s) 206 and associated memory device(s) 208 configured to perform a variety of computer-implemented functions (e.g., performing the methods, steps, calculations and the like and storing relevant data as disclosed herein). Additionally, the subsystem controller 200 may also include a communications module 210 to facilitate communications between the subsystem controller 200 and the various components of the power generating subsystem(s) 120 and the POI 122. Further, the communications module 210 may include a sensor interface 212 (e.g., one or more analog-to-digital converters) to permit signals transmitted from the sensor(s) 134 to be converted into signals that can be understood and processed by the processors 206. It should be appreciated that the sensor(s) 134 may be communicatively coupled to the communications module 210 using any suitable means. For example, the sensor(s) 134 may be coupled to the sensor interface 212 via a wired connection. However, in other embodiments, the sensor(s) 134 may be coupled to the sensor interface 212 via a wireless connection, such as by using any suitable wireless communications protocol known in the art. Additionally, the communications module 210 may also be operably coupled to an operating state control module 214 configured to change at least one power generating asset operating state in response to the generation of a set point.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the subsystem controller 200 to perform various functions. The various functions may include, but are not limited to, obtaining data signals indicative of an electrical parameter at the POI 122 and the power generating subsystem(s) 120, generating a modeled value for the electrical parameter and generating a setpoint command based on the modeled value, as described herein, as well as various other suitable computer-implemented functions. In an embodiment the generation of the modeled value may be accomplished via a feedback fidelity improvement module 216 of the subsystem controller 200.

Referring still to FIGS. 1-4 and particularly to FIG. 4, in an embodiment, the subsystem controller 200 of the system 300 may be configured to obtain a first data signal 302 indicative of an electrical parameter at the POI 122. In an embodiment, wherein the power generating subsystem(s) 120 is configured as a power generating facility 128, such as a wind farm, a solar plant, a hydroelectric plant, or a hybrid power generation facility, the first data signal 302 may be received from the electrical grid 126. The first data signal 302 may correspond to a feedback signal related to an electrical parameter that is regulated at the grid 126, wherein a utility provider that operates the electrical grid may also supply a setpoint value for the electrical parameter. However, in an additional embodiment, wherein the power generating subsystem(s) 120 is configured as a power generating asset 130 rather than a power generating facility 128, the first data signal 302 may be received from the power generating facility 128 rather than the electrical grid 126. For example, in an embodiment, wherein the power generating subsystem(s) 120 is configured as a wind turbine 132, the first data signal 302 may be received from the wind farm (via the wind farm controller) of which the wind turbine 132 is a component thereof.

In an embodiment, the first data signal 302 may be a value for the electrical parameter measured at the POI 122 and may indicate the voltage, current, power, and/or frequency present at the POI 122. Accordingly, the first data signal 302 may reflect the combined effect of all of operating the power generating subsystems 120 electrically coupled to the POI 122 at a given time. For example, in an embodiment, the first data signal 302 may reflect the net voltage delivered to the POI 122 by each of the power generating subsystems 120 coupled thereto.

In an embodiment, the first data signal 302 may have a first signal fidelity. The first signal fidelity may be a measure of a refresh rate, a sensor accuracy, sensor resolution, and/or a communication delay. For example, the first data signal 302 may be transmitted by the POI 122 at a refresh rate exceeding 10 seconds. Accordingly, the subsystem controller 200 may receive an update reflecting the electrical parameter at the POI 122 once every 14 seconds, for example. In an embodiment, this may be considered to be a low-fidelity signal. It should be appreciated that a difference between the real-time electrical parameter values at the POI 122 and the latest reported electrical parameter values may develop and increase as the time elapsed since the last update from the POI 122 increases. In turn, this may result in the power generating subsystem(s) 120 operating at a point of lower efficiency than would be otherwise obtainable with a higher fidelity signal from the POI 122 (e.g. a signal refreshed at a significantly greater frequency). It should further be appreciated that the POI 122 and the power generating subsystem(s) 120 may be owned by different entities. As such, the power generating subsystem(s) 120 may have limited ability to affect the first signal fidelity in order to improve the operating efficiency of the power generating subsystem(s) 120.

Referring still in particular to FIG. 4, in an embodiment, the subsystem controller 200 of the system 300 may be configured to obtain a second data signal 304 indicative of the electrical parameter at the power generating subsystem(s) 120. The electrical parameter indicated by the second data signal 304 may be the same electrical parameter (e.g. voltage, current, power, and/or frequency) indicated by the first data signal 302, but with the value of the second data signal 304 reflecting the output of the power generating subsystem 120. It should therefore be appreciated that, the value of the second data signal 304 may be some portion of the value of the first data signal 302 for the same electrical parameter.

In an embodiment, the second data signal 304 may be received from the sensor(s) 134 and/or any other suitable component of the power generating subsystem(s) 120. Accordingly, the second data signal may have a second signal fidelity which is higher than the first signal fidelity. For example, in an embodiment, the sensor(s) 134 may generate the second data signal 304 at a refresh rate exceeding twice per second (e.g., a refresh rate of once every 40 milliseconds (ms)). As such, the subsystem controller 200 may receive the second data signal 304 indicating the output of the power generating subsystem 120 essentially continuously. It should be appreciated that due to the higher fidelity of the second data signal 304 the subsystem controller 200 may have a significantly more accurate understanding of the value of electrical parameter at the power generating subsystem 120 than at the POI 122 until such time as an updated first data signal is received by the subsystem controller 200.

Therefore, while the subsystem controller 200 may have an accurate understanding of the performance/efficiency of the power generating subsystem 120, the subsystem controller 200, based solely on the first and second data signals 302, 304, may not have an accurate awareness of whether the power generating subsystem 120 is operating efficiently with respect to satisfying the requirements of the POI 122.

In order to utilize the first and second data signals 302, 304 to determine an efficient operating state for the power generating subsystem(s) 120, the subsystem controller 200 may, in an embodiment, be configured, at 306, to generate a first modeled value 308 for the electrical parameter at the POI 122. In an embodiment, the subsystem controller 200 may utilize the higher-fidelity second data signal 304 to compensate for the lower-fidelity first data signal 302 to generate the first modeled value 308. In other words, because the first data signal 302 may lack sufficient fidelity to support the efficient operation of the power generating subsystem(s) 120, the first modeled value 308 may simulate a value of the first data signal 302 which would be anticipated if the first data signal 302 was of a higher fidelity. This simulated value may then be utilized by the subsystem controller 200 control the power generating subsystem(s) 120.

In an embodiment, wherein the first signal fidelity is, for example, limited by the refresh rate of the first data signal 302 transmitted by the POI 122, the first data signal 302 accurately reflects the electrical parameter at the POI 122 only at the instant of transmission, with the accuracy of the reflection potentially decreasing until the next first data signal value is transmitted by the POI 122. Therefore, the higher-fidelity second data signal 304 may be employed to model/predict what the value of the first data signal 302 would have been in the interval between refreshes of the first data signal 302. For example, in an embodiment wherein the first data signal 302 has a refresh rate of 15 seconds and the second data signal 304 has a refresh rate of 50 ms, the first modeled value 308 may be computed in 50 ms intervals until a refreshed first data signal 302 is received after 15 seconds. In other words, because the second data signal 304 may be employed to improve the fidelity of the first data signal 302 in the periods between refreshes, the first data signal 302 may serve as a baseline for the system 300. It should be appreciated that while the preceding explanation was directed to fidelities correlating to the respective refresh rates, the concepts described herein apply equally to fidelities related to other modalities, such as sensor accuracy, sensor resolution, and/or communication delays.

Referring still in particular to FIG. 4, in an embodiment, the subsystem controller 200 may, at 310, generate a set point command for the power generating subsystem(s) 120 based, at least in part, on the first modeled value 308 for the electrical parameter. In response to the setpoint command, the power generating subsystem(s) 120 may, at 312, generate a quantity of power which may be measured by the sensor(s) 134 and/or a component of the power generating subsystem(s) 120.

As further depicted at 314 of FIG. 4, the subsystem controller 200 of the system 300 may, be configured to generate the first modeled value 308 by first determining a difference between the value of the first data signal 302 and the value of the second data signal 304. As the value of the first data signal 302 may reflect the net effects of each of the power generating subsystems 120 coupled to the POI 122, while the value of the second data signal reflects the power generation of a single power generating subsystem 120, in an embodiment, the value of the first data signal 302 may be greater than the value of the second data signal 304.

In an embodiment, as depicted at 316, the subsystem controller 200 may filter the difference between the first data signal 302 and the second data signal 304 to generate a correlation value 318. For example, in an embodiment, filtering the difference between the first data signal 302 and the second data signal 304, as determined at step 314, may include applying a lag filter to the difference. In an embodiment, filtering the difference between the first data signal 302 and the second data signal 304, as determined at step 314, may include applying a static (e.g., fixed time constant) lag filter, a dynamic (e.g., changing time constant) lag filter, an exponential filter, a bandpass filter, a low pass filter, a high pass filter, and/or a Kalman filter to the difference. In an embodiment, the subsystem controller 200 may, at 320, add the correlation value 318 to the second data signal 304 to establish the first modeled value 308 for the electrical parameter. The first modeled value 308 may simulate a value of the first data signal 302 having a higher fidelity.

Referring still to FIGS. 1-4, in an embodiment, the system 300 may include a plurality of power generating subsystems 120 coupled to the POI 122. For example, the system 300 may, in an embodiment, include a first power generating subsystem 136 and a second power generating subsystem 138. Each of the first and second power generating subsystems 136, 138 may include a subsystem controller 200. In such an embodiment, the first power generating subsystem 136 may utilize the steps described herein to generate a setpoint command based off the first modeled value 308. Additionally, the subsystem controller 200 of the second power generating subsystem 138 may be configured to obtain the same first data signal 302. However, the subsystem controller 200 of the second power generating subsystem 138 may also be configured to obtain a third data signal 322 indicative of the electrical parameter at the second power generating subsystem 138. The third data signal 322 may have a third signal fidelity that is higher than the first signal fidelity. In the same manner as the subsystem controller 200 for the first power generating subsystem 136, the subsystem controller 200 of the second power generating subsystem 138 may, at 324, generate a second modeled value 326 utilizing the steps described herein. The subsystem controller 200 for the second power generating subsystem 138 may, at 328, generate a setpoint command for the second power generating mode 138 based, at least in part, on the second modeled value 326 for the electrical parameter, thereby facilitating, at 330, power generation by the second power generating subsystem 138.

As further depicted in FIG. 4, in an embodiment, the first and second power generating subsystems 136, 138 may not be communicatively coupled with regards to the second and third data signals 304, 332. Accordingly, the third data signal 322 may be unknown to the first power generating subsystem 136 and the second data signal 304 may be unknown to the second power generating subsystem 138. In other words, while both the first and second power generating subsystems 136, 138 may receive the same broadcast of the first data signal 302, the first and second power generating subsystems 136, 138 may not communicate with each other the respective outputs of the sensors 134. Instead of requiring a communication link, the system 300 facilitates asynchronous control of the plurality of generating subsystems 120 by requiring each of the generating subsystems 120 to generate the respective setpoint commands based off of the respective modeled values, which are, in turn, baselined off of the broadcasted first data signal 302. By utilizing the first data signal 302 as a common feedback source under pending the respective modeled values for the control of the interconnected generating subsystems 120, high-speed, accurate, and coordinated control may be established between the plurality of generating subsystems 120 without requiring the sharing of information or commands between the generating subsystems 120. For example, in an embodiment wherein the plurality of generating subsystems 120 are configured as at least two windfarms, the system 300 does not require a communication link between the windfarms. It should be appreciated that the absence of a communication link between the windfarms may reduce/eliminate costs and/or complexities inherent in coordinating between the windfarms dispersed at a distance one another and/or operated by different entities. It should further be appreciated that the absence of a communication link between wind turbines of a wind farm may reduce/eliminate costs, complexities, and/or bandwidth requirements for a communication infrastructure of the wind farm.

It should further be appreciated that in an embodiment wherein the plurality of power generating subsystems 120 are communicatively decoupled from one another with regards to the data signals received from the respective sensors 134, the plurality of generating subsystems 120 may be communicatively coupled with regards to other aspects of power generation operations. For example, the plurality of generating subsystems 120 may be part of a distributed sensor network wherein readings from distributed environmental sensors are shared amongst the participants while still retaining separation with regards to the respective data signals.

In an embodiment wherein the plurality of power generating subsystems 120 are communicatively decoupled from one another with regards to the data signals received from the respective sensors 134, the plurality of power generating subsystems 120 may perform a droop-based control strategy when regulating the second modeled value. In an embodiment, a droop-based control strategy may include simulating the drooping characteristics of a traditional generator set. For example, in an embodiment wherein multiple communication line-free power generating subsystems 120 are connected in parallel, each power generating subsystem 120 may self-detect its own output electrical parameter. The output electrical parameter may then be adjusted relative to a reference output voltage amplitude and the frequency obtained by carrying out droop control. By employing a droop-based control strategy each power generating subsystem 120 may be able to adjust the electrical parameter, output active power and reactive power, automatically, and participate in the regulation of grid voltage and frequency.

Referring back to FIG. 1, in an embodiment, the communicative decoupling between the plurality of generating subsystems 120 may be considered to be a communication airgap 140. In an embodiment, the establishment of the communication airgap 140 between the first and second power generating subsystems 136, 138 may enhance a cybersecurity posture of the respective power generating subsystems 120 relative to communicatively coupled power generating subsystems. The cybersecurity posture of the power generating subsystems 120 may indicate the relative vulnerability of the power generating subsystems to a cyberattack. Accordingly, reducing, or eliminating, communication access points to the power generating subsystem(s) 120 may reduce a number of possible avenues for intrusion and thereby increase the cybersecurity posture of the power generating subsystem(s) 120.

Referring back to FIG. 4, in an embodiment, the subsystem controller 200 of the system 300 may be configured, at 332, to compare the first data signal 302 to at least one data validity parameter. For example, in an embodiment, the data validity parameter may include a range of acceptable values of the first data signal, a required refresh interval, a required signal quality, and/or any other combination of parameters selected to indicate a validity state of the first data signal 302. In an embodiment wherein the comparison, at 334, indicates that the first data signal 302 is invalid, the subsystem controller 200 may, at 336, disregard the first data signal 302. In such an embodiment, the subsystem controller 200 may be configured to generate the modeled value using the last known valid first data signal 302. In an additional embodiment, the subsystem controller 200 may be configured to utilize a default first data signal 302 until such time as a valid first data signal 302 may be received.

FIG. 5 is a schematic diagram of a method of operation of the power generating system 300 of FIG. 5 configured for coordinated voltage regulation at the POI by multiple wind farms via reactive power (Q) control/response at the individual wind farms, wherein each of the wind farms functions as a power generating subsystem 136, 138 and includes a wind farm controller functioning as the subsystem controller 200.

Referring to FIG. 5, the first data signal 302 corresponds to the voltage measured at the POI from the combined output of all of the wind farms. As discussed above, the first data signal 302 may correspond to a feedback signal related to an electrical parameter that is regulated at the grid 126, wherein a utility provider that operates the electrical grid may also supply a setpoint value 402 for the electrical parameter. The POI may also be considered as the point of connection with the electrical grid. The second data signal 304 corresponds to the output voltage of the individual wind farm functioning as the first power generating subsystem 136. Thus, the second data signal 304 corresponds to the individual contribution of the wind farm to the first data signal 302. At step 305, a difference value between the first 302 and second 304 data signals is generated.

At step 314 in FIG. 5, the difference value obtained at step 305 is filtered to obtain the correlation value voltage 318. The filtering process may include application of a lag filter. The correlation value voltage 318 is used at step 320 to modify the second data signal 304 to generate the first modeled value voltage 318.

At step 315 in FIG. 5, a voltage droop logic is applied based on the self-detected local reactive power value 325, which corresponds to reactive power (Q) supplied by the wind farm (first power generating subsystem 136). The voltage droop is applied at step 317 to modify the setpoint voltage 402 of the parameter regulated at the POI. The setpoint voltage 402 is typically established by the utility provider. At step 319, the modified setpoint voltage is adjusted by the first modeled value voltage 308 obtained in step 320 to generate an error signal 400 ($V_{error}$). This error signal 400 is used at step 310 to generate the reactive power command ($Q_{cmd}$) 407 that is transmitted to the individual wind turbines within the wind farm and used by the individual wind turbine controllers for reactive power control and response and control at the wind turbine level.

FIG. 6 is a schematic diagram of an alternate method of operation of the power generating system 300 that may also be employed for voltage regulation at the POI via coordination of reactive power (Q) control and response at multiple wind farms. As in FIG. 5, the individual wind farm controllers function as the subsystem controller 200 and the multiple wind farms function as the different power generating subsystems 136, 138.

Referring to FIG. 6, the first data signal 302 corresponds to the voltage at the POI from the combined output of all of the wind farms. As discussed above, the first data signal 302 may correspond to a feedback signal related to an electrical parameter that is regulated at the grid 126, wherein a utility provider that operates the electrical grid may also supply a setpoint value 402 for the electrical parameter. The POI may also be considered as the point of connection with the electrical grid. The second data signal 304 corresponds to the output voltage of the individual wind farm functioning as the first power generating subsystem 136. Thus, the second data signal 304 corresponds to the individual contribution of the wind farm to the first data signal 302. At step 305, a difference value between the first 302 and second 304 data signals is generated.

At step 410, a long term voltage droop logic is determined based on the self-detected local reactive power (Q) supplied by the wind farm. This long term droop value is applied at step 305 to modify the difference value between the first 302 and second 304 data signals.

At step 314 in FIG. 6, the difference value obtained at step 305 is filtered (e.g., via application of a lag filter) to obtain the correlation value voltage 318.

At step 408, the correlation value voltage 318 is applied to the parameter setpoint value 402 for the electrical parameter regulated at the POI and established by the utility provider to generate a modified parameter setpoint value 413.

At step 412, a short term voltage droop logic is determined based on the self-detected local reactive power (Q) supplied by the wind farm. This short term droop value is applied at step 415 to the modified parameter setpoint value 413.

Application of the long term voltage droop logic and step 410 and the short term voltage droop logic and 412 addresses how the multiple wind farms will respond to a voltage disturbance on the grid. If a large change in voltage occurs, there are two parts to the combined response of all the wind farm facilities. The first is a dynamic "short term" response, which governs how each windfarm facility responds in the timeframe from 1-~30 seconds. The short term voltage droop logic is designed so that the individual wind farms can be tuned to provide a similar response in the 1-~30 seconds time frame. The beneficial consideration here is that the reactive power injection in this initial response to a disturbance can be tuned and balanced between the different windfarms.

The steady state performance that governs the ~30s+ response is addressed by the long term voltage droop logic. This dictates the overall accuracy of the voltage regulation strategy via reactive power control/response across all the participating facilities (windfarms). The long term voltage droop logic also has an impact on dynamic response (1-30 seconds), but such impact is overshadowed by the short term voltage droop logic.

At step 417, a difference is determined between the further modified parameter setpoint voltage 413 (adjusted by the short term voltage droop logic at step 415) and the second data signal 304 and used to generate the error signal 400 ($V_{error}$). This error signal value 400 is used at step 310 to generate the reactive power command ($Q_{cmd}$) 407 that is transmitted to the individual wind turbines within the wind farm and used by the individual wind turbine controllers for reactive power generation and control at the wind turbine level.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: A method for controlling a power generating system, the power generating system comprising at least one power generating subsystem connected to a point of interconnection (POI), the method comprising: obtaining, with a subsystem controller of the power generating subsystem, a first data signal corresponding to a feedback signal of an electrical parameter regulated at the POI, the feedback signal having a first signal fidelity; obtaining, with the subsystem controller, a second data signal indicative of the electrical parameter generated at the power generating subsystem, the second data signal having a second signal fidelity that is higher than the first signal fidelity; with the subsystem controller, generating a correlation value between the first and second data signals by filtering a value difference between the first and second data signals and applying the correlation value to a setpoint value for the electrical parameter regulated at the POI to generate a modified setpoint value; and with the subsystem controller, using the modified setpoint value and the second data signal to generate a setpoint command for the power generating subsystem and controlling generation of power at the power generating subsystem using the setpoint command to regulate the electrical parameter at the POI.

Clause 2: The method of clause 1, wherein the filtering comprises applying a lag filter to the value difference between the first and second data signals.

Clause 3: The method of any preceding clause, further comprising applying a long term droop value to the value difference between the first and second data signals.

Clause 4: The method of any preceding clause, further comprising applying a short term droop value to the modified parameter setpoint value.

Clause 5: The method of any preceding clause, further comprising applying a long term droop value to the value difference between the first and second data signals and a short term droop value to the modified parameter setpoint value.

Clause 6: The method of any preceding clause, wherein the power generating system comprises a plurality of the power generating subsystems each having a corresponding subsystem controller, wherein the first data signal and the setpoint value are common to each of the subsystem controllers for performing the method.

Clause 7: The method of any preceding clause, wherein the plurality of power generating subsystems are not communicatively coupled with regards to the second data signal obtained by each of the subsystem controllers such that the second data signal from a first one of the power generating subsystems is unknown to the subsystem controller of a second one of the power generating subsystems.

Clause 8: The method of any preceding clause, wherein the power generating subsystems are individual wind farms connected at the POI and the subsystem controllers are individual wind farm controllers, and wherein the first data signal and the setpoint value for the parameter regulated at the POI are obtained from a utility provider of an electrical grid connected to the POI.

Clause 9: The method of any preceding clause, wherein the power generating subsystems are individual wind turbines within a wind farm and the subsystem controllers are individual wind turbine controllers, and wherein the first data signal and the setpoint value for the parameter regulated at the POI are obtained from a wind farm controller for the wind farm.

Clause 10: The method of any preceding clause, wherein the first and second data signal fidelities comprise a measure of at least one of a refresh rate, a sensor accuracy, a sensor resolution, or a communication delay.

Clause 11: The method of any preceding clause, wherein the electrical parameter comprises at least one of voltage, current, power, or frequency.

Clause 12: A system for controlling a power generating system, the system comprising: at least one power generating subsystem connected to a point of interconnection (POI); and a subsystem controller of the at least one power generating subsystem, the subsystem controller comprising at least one processor configured to perform a plurality of operations, the plurality of operations comprising: obtain a first data signal corresponding to a feedback signal of an electrical parameter regulated at the POI, the first data signal having a first signal fidelity; obtain a second data signal indicative of the electrical parameter generated at the power generating subsystem, the second data signal having a second signal fidelity that is higher than the first signal fidelity; generate a correlation value between the first and second data signals by filtering a value difference between the first and second data signals; generate a modified setpoint value by applying the correlation value to a setpoint value for the electrical parameter regulated at the POI; use the modified setpoint value to generate a setpoint command for the power generating subsystem; and control power generation at the power generating subsystem using the setpoint command to regulate the electrical parameter at the POI.

Clause 13: The system of clause 12, wherein generating the correlation value comprises applying a lag filter to the value difference between the first and second data signals.

Clause 14: The system of any preceding clause, wherein the subsystem controller is further configured to apply a long term droop value to the value difference between the first and second data signals and a short term droop value to the modified parameter setpoint value.

Clause 15: The system of any preceding clause, further comprising a plurality of the power generating subsystems each having a corresponding subsystem controller, wherein the first data signal and the parameter setpoint value are used by each of the subsystem controllers to perform the plurality of operations.

Clause 16: The system of any preceding clause, wherein the plurality of power generating subsystems are not communicatively coupled with regards to the second data signal obtained by each of the subsystem controllers such that the second data signal from a first one of the power generating subsystems is unknown to a second one of the power generating subsystems.

Clause 17: The system of any preceding clause, wherein the power generating subsystems comprise individual wind farms connected at the POI and the subsystem controllers are wind farm controllers, and wherein the first data signal and the setpoint value for the parameter regulated at the POI are obtained from a utility provider of an electrical grid connected to the POI.

Clause 18: The system of any preceding clause, wherein the power generating subsystems comprise individual wind turbines within a wind farm and the subsystem controllers comprise individual wind turbine controllers, and wherein the first data signal and the setpoint value are obtained from a wind farm controller for the wind farm.

Clause 19: The system of any preceding clause, wherein the first and second signal fidelities comprise a measure of at least one of a refresh rate, a sensor accuracy, a sensor resolution, or a communication delay.

Clause 20: The system of any preceding clause, wherein the at least one power generating subsystem comprises one of a solar power plant, a hydroelectric plant, or a hybrid power generation facility, and wherein the first data signal is obtained from an electrical grid.

What is claimed is:

1. A method for controlling a power generating system, the power generating system comprising at least one power generating subsystem connected to a point of interconnection (POI), the method comprising:
   receiving at a subsystem controller of the power generating subsystem, a first data signal corresponding to a feedback signal of an electrical parameter regulated at the POI, the feedback signal having a first signal fidelity;
   receiving at the subsystem controller, a second data signal indicative of the electrical parameter generated at the power generating subsystem, the second data signal having a second signal fidelity that is higher than the first signal fidelity;
   with the subsystem controller, generating a correlation value between the first and second data signals by filtering a value difference between the first and second data signals and applying the correlation value to a setpoint value for the electrical parameter regulated at the POI to generate a modified setpoint value; and
   with the subsystem controller, using the modified setpoint value and the second data signal to generate a setpoint command for the power generating subsystem and controlling generation of power at the power generating subsystem using the setpoint command to regulate the electrical parameter at the POI.

2. The method of claim 1, wherein the filtering comprises applying a lag filter to the value difference between the first and second data signals.

3. The method of claim 1, further comprising applying a droop value to the value difference between the first and second data signals.

4. The method of claim 1, further comprising applying a droop value to the modified parameter setpoint value.

5. The method of claim 1, further comprising applying a first droop value to the value difference between the first and second data signals and a second droop value to the modified parameter setpoint value.

6. The method of claim 1, wherein the power generating system comprises a plurality of the power generating subsystems each having a corresponding subsystem controller, wherein the first data signal and the setpoint value are common to each of the subsystem controllers for performing the method.

7. The method of claim 6, wherein the plurality of power generating subsystems are not communicatively coupled with regards to the second data signal obtained by each of the subsystem controllers such that the second data signal from a first one of the power generating subsystems is unknown to the subsystem controller of a second one of the power generating subsystems.

8. The method of claim 6, wherein the power generating subsystems are individual wind farms connected at the POI and the subsystem controllers are individual wind farm controllers, and wherein the first data signal and the setpoint value for the parameter regulated at the POI are obtained from a utility provider of an electrical grid connected to the POI.

9. The method of claim 6, wherein the power generating subsystems are individual wind turbines within a wind farm and the subsystem controllers are individual wind turbine controllers, and wherein the first data signal and the setpoint value for the parameter regulated at the POI are obtained from a wind farm controller for the wind farm.

10. The method of claim 1, wherein the first and second data signal fidelities comprise a measure of at least one of a refresh rate, a sensor accuracy, a sensor resolution, or a communication delay.

11. The method of claim 1, wherein the electrical parameter comprises at least one of voltage, current, power, or frequency.

12. A system for controlling a power generating system, the system comprising:
at least one power generating subsystem connected to a point of interconnection (POI); and
a subsystem controller of the at least one power generating subsystem, the subsystem controller comprising at least one processor configured to perform a plurality of operations, the plurality of operations comprising:
receive a first data signal corresponding to a feedback signal of an electrical parameter regulated at the POI, the first data signal having a first signal fidelity;
receive a second data signal indicative of the electrical parameter generated at the power generating subsystem, the second data signal having a second signal fidelity that is higher than the first signal fidelity;
generate a correlation value between the first and second data signals by filtering a value difference between the first and second data signals;
generate a modified setpoint value by applying the correlation value to a setpoint value for the electrical parameter regulated at the POI;
use the modified setpoint value to generate a setpoint command for the power generating subsystem; and
control power generation at the power generating subsystem using the setpoint command to regulate the electrical parameter at the POI.

13. The system of claim 12, wherein generating the correlation value comprises applying a lag filter to the value difference between the first and second data signals.

14. The system of claim 12, wherein the subsystem controller is further configured to apply a first droop value to the value difference between the first and second data signals and a second droop value to the modified parameter setpoint value.

15. The system of claim 12, further comprising a plurality of the power generating subsystems each having a corresponding subsystem controller, wherein the first data signal and the parameter setpoint value are used by each of the subsystem controllers to perform the plurality of operations.

16. The system of claim 15, wherein the plurality of power generating subsystems are not communicatively coupled with regards to the second data signal obtained by each of the subsystem controllers such that the second data signal from a first one of the power generating subsystems is unknown to a second one of the power generating subsystems.

17. The system of claim 15, wherein the power generating subsystems comprise individual wind farms connected at the POI and the subsystem controllers are wind farm controllers, and wherein the first data signal and the setpoint value for the parameter regulated at the POI are obtained from a utility provider of an electrical grid connected to the POI.

18. The system of claim 15, wherein the power generating subsystems comprise individual wind turbines within a wind farm and the subsystem controllers comprise individual wind turbine controllers, and wherein the first data signal and the setpoint value are obtained from a wind farm controller for the wind farm.

19. The system of claim 12, wherein the first and second signal fidelities comprise a measure of at least one of a refresh rate, a sensor accuracy, a sensor resolution, or a communication delay.

20. The system of claim 12, wherein the at least one power generating subsystem comprises one of a solar power plant, a hydroelectric plant, or a hybrid power generation facility, and wherein the first data signal is obtained from an electrical grid.

* * * * *